United States Patent
Sugita et al.

(10) Patent No.: US 6,887,593 B2
(45) Date of Patent: May 3, 2005

(54) MASTER INFORMATION CARRIER FOR MAGNETIC TRANSFER

(75) Inventors: Ryuji Sugita, Hitachi (JP); Masakazu Nishikawa, Odawara (JP); Tadashi Yasunaga, Odawara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/661,477

(22) Filed: Sep. 15, 2003

(65) Prior Publication Data

US 2004/0081856 A1 Apr. 29, 2004

(30) Foreign Application Priority Data

Sep. 13, 2002 (JP) ........................... 2002-268431

(51) Int. Cl.⁷ ............................ G11B 5/86; B32B 15/04
(52) U.S. Cl. ........................ 428/692; 360/15; 360/17
(58) Field of Search .................. 428/692; 360/16, 360/17

(56) References Cited

U.S. PATENT DOCUMENTS 6,347,016 B1 * 2/2002 Ishida et al. ................ 360/17

2001/0028964 A1 10/2001 Nagao et al.

FOREIGN PATENT DOCUMENTS

| EP | 0 915 456 A1 | 5/1999 |
| EP | 1 132 898 A2 | 9/2001 |
| EP | 1 256 940 A2 | 11/2002 |
| EP | 1 260 970 A2 | 11/2002 |
| EP | 1 316 948 A2 | 6/2003 |

* cited by examiner

Primary Examiner—D. S. Nakarani
Assistant Examiner—Nikolas J. Uhlir
(74) Attorney, Agent, or Firm—Sughrue Mion, PLLC

(57) ABSTRACT

A master information carrier for magnetic transfer includes a substrate having an irregularity pattern representing information to be transferred to a slave medium and a magnetic layer formed on the irregularity pattern on the substrate. The depth d of the recessed portions of the irregularity pattern and the thickness t of the magnetic layer formed on the recessed portions satisfy formula $-0.004 \leq (t-d)/d \leq 0.1$. At the same time, the magnetic layer formed on the protruding portion of the irregularity pattern and the magnetic layer formed on the recessed portions of the irregularity pattern are connected with each other.

11 Claims, 2 Drawing Sheets

MASTER INFORMATION CARRIER FOR MAGNETIC TRANSFER

BACKGROUND OF THE INVENTION

1. Field of the Invention

This invention relates to a master information carrier for magnetic transfer carrying thereon an irregularity pattern representing information to be transferred to a magnetic recording medium.

2. Description of the Related Art

This invention is applied to magnetic transfer in which a master information carrier (patterned master) having thereon an irregularity pattern (pattern of protruding portions) representing information (e.g., a servo signal) to be transferred and a magnetic layer provided at least on the surface of the irregularity pattern is brought into close contact with a magnetic recording medium (a slave medium), and a transfer magnetic field is applied to the slave medium and the master information carrier in close contact with each other, thereby magnetically transferring a magnetization pattern representing the information carried by the master information carrier from the master information carrier to the slave medium.

A master information carrier comprising a substrate provided on its surface with an irregularity pattern representing information to be transferred and a thin magnetic layer formed on the surface of the irregularity pattern is disclosed, for instance, in U.S. Patent Laid-Open No. 20010028964.

Basic steps of the magnetic transfer will be described with reference to FIGS. 2A to 2C, hereinbelow. In FIGS. 2A to 2C, the magnetic transfer by in-plane recording is shown. A slave medium 2 having a magnetic layer to which information is magnetically transferred and a master information carrier 3 comprising, as shown in FIG. 2B, a substrate 31 provided on its surface with an irregularity pattern representing the information to be transferred and a magnetic layer 32 formed on the surface of the irregularity pattern are first prepared. An initial magnetostatic field Hin is first applied to the slave medium 2 in one direction parallel to the recording tracks thereof, thereby magnetizing the slave medium 2 in an initial magnetization (DC erasure) as shown in FIG. 2A. Thereafter, the magnetic layer 32 on the upper surface of the protruding portions of the irregularity pattern on the surface of the substrate 31 of the master information carrier 3 is brought into a close contact with the recording surface of the slave medium 2. In this state, a transfer magnetic field Hdu is applied in the direction opposite to the initial magnetic field Hin as shown in FIG. 2B, thereby magnetically transferring the information on the master information carrier 3 to the slave medium 2. Since the transfer magnetic field Hdu is absorbed in the magnetic layer 32 on the upper surface of the protruding portions of the irregularity pattern on the surface of the master information carrier 3 and accordingly, the magnetic field is not reversed at portions opposed to the protruding portions and is reversed at portions not opposed to the protruding portions. As a result, magnetization pattern corresponding to the irregularity pattern on the master information carrier 3 is transferred to the tracks of the slave medium 2 as shown in FIG. 2C. Information can be magnetically transferred to a slave medium also in a perpendicular recording system by the use of a master information carrier having substantially the same irregularity pattern of a magnetic layer.

In such patterned magnetic transfer, a high quality signal can be transferred to a slave medium by designing the master information carrier so that the magnetic fluxes are efficiently converged between the protruding portions of the irregularity pattern of the master information carrier.

Conventionally, the master information carrier has been produced so that the thickness of the magnetic layer formed on the irregularity pattern is smaller than the depth of the recessed portions on the basis of the idea that absorption of magnetic fluxes by the magnetic layer on the protruding portions of the irregularity pattern of the master information carrier is increased by making the magnetic layer on the protruding portions structurally independent from that on the recessed portions of the irregularity pattern. That is, conventionally the distance between the lower side of the magnetic layer on the protruding portions and the upper side of the magnetic layer on the recessed portions is large so that the former and the latter are isolated from each other. This has contributed to increase in reproduction output in reading the magnetization pattern transferred to the slave medium but causes sub-peaks (noise) to appear in the reproduction waveform. As a result, desired information cannot be recorded on the slave medium.

That is, when the magnetization pattern is magnetically transferred to a slave medium from such a master information carrier, though peak outputs are generated in the waveform of the signal reproduced from the slave medium corresponding to opposite ends of the magnetic layer on the protruding portions of the master information carrier, sub-peaks can appear forward or rearward of the peak output as noise and the sub-peak waveform can be read as representing the information.

It is preferred from the viewpoint of magnetic transfer properties that the magnetic layer is provided only on the protruding portions and not provided on the recessed portions. However it is difficult to provide the magnetic layer only on the protruding portions and such a master information carrier is disadvantageous in cost.

SUMMARY OF THE INVENTION

In view of the foregoing observations and description, the primary object of the present invention is to provide a master information carrier which can ensure sufficient reproduction output power and can suppress generation of sub-peaks, thereby enabling high quality magnetic transfer.

In accordance with the present invention, there is provided a master information carrier comprising a substrate having an irregularity pattern representing information to be transferred to a slave medium and a magnetic layer formed on the irregularity pattern on the substrate, wherein the improvement comprises that formula $-0.004 \leq (t-d)/d \leq 0.1$ is satisfied wherein d represents the depth of the recessed portions of the irregularity pattern and t represents the thickness of the magnetic layer formed on the recessed portions, and the magnetic layer formed on the protruding portion of the irregularity pattern and the magnetic layer formed on the recessed portions of the irregularity pattern are connected with each other.

When $(t-d)/d$ is smaller than $-0.004$ and the protruding portion magnetic layer (the magnetic layer formed on the protruding portion of the irregularity pattern) and the recessed portion magnetic layer (the magnetic layer formed on the recessed portions of the irregularity pattern) are not connected with each other, generation of sub-peaks is significant. Whereas, when $(t-d)/d$ is larger than 0.1 and the protruding portion magnetic layer and the recessed portion magnetic layer are excessively connected with each other, drop of output power is significant. Further, it is preferred that formula $0.01 \leq \delta/t < 0.5$ be satisfied wherein $\delta$ represents the thickness of the magnetic layer of the side wall connecting the magnetic layer on the protruding portions and the magnetic layer on the recessed portions and t represents the thickness of the magnetic layer formed on the recessed portions. More preferably, $\delta$ and t satisfy formula $0.02 \leq \delta/t < 0.3$. When $\delta/t < 0.01$, absorption of the magnetic flux of the magnetic layer is too poor and a sub-peak is generated. When $\delta/t \leq 0.5$, magnetic fluxes in the area free from the pattern are absorbed by the magnetic layer of the side surface of the protruding portion, and the quality of the recorded signal can be deteriorated.

DESCRIPTION OF THE PREFERRED EMBODIMENT

Figure 1:
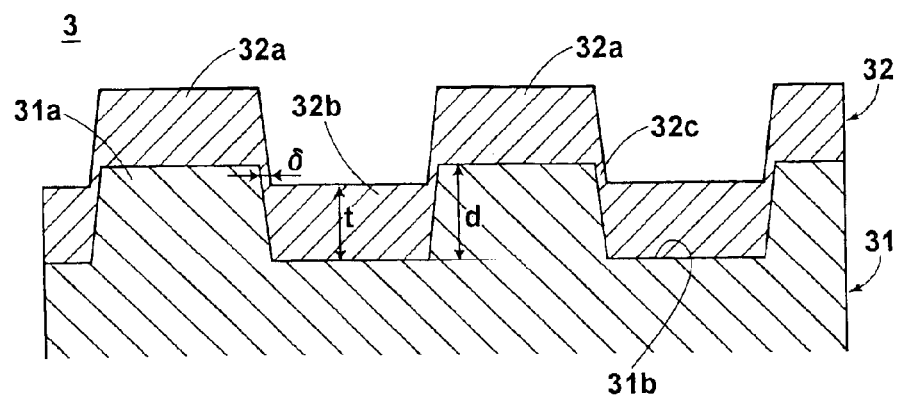
FIG. 1 is a fragmentary cross-sectional showing a part of a master information carrier in accordance with an embodiment of the present invention.

In FIG. 1, a master information carrier 3 in accordance with an embodiment of the present invention comprises a substrate 31 formed with a fine irregularity pattern (a pattern of a plurality of protruding portions 31a and a plurality of recessed portions 31b) representing information to be transferred, and a magnetic layer 32 formed on the irregularity pattern. The substrate 31 may be formed with the irregularity pattern by various methods and the magnetic layer 32 may be formed by various film forming methods.

The upper surface of each protruding portion 31a is flat and the side surfaces of each protruding portion 31a are diverged downward so that the protruding portion 31a becomes larger in plan downward and the recessed portion becomes larger in plan upward. The magnetic layer 32 comprises a protruding portion magnetic layer 32a formed on the upper surface of the protruding portions 31a, a recessed portion magnetic layer 32b formed on the bottom of the recessed portions 31b and a connecting magnetic layer 32c which connects the protruding portion magnetic layer 32a and the recessed portion magnetic layer 32b on the side surface near the upper surface of the protruding portion 31a. The side surface of the protruding portion 31a need not be inclined but may be vertical. The upper surface of each protruding portion 31a is substantially square in plan.

The depth d of the recessed portions 31b (the height of the protruding portions 31a) of the irregularity pattern on the substrate 31 and the thickness t of the recessed portion magnetic layer 32b formed on the recessed portions 31b satisfy formula $-0.004 \leq (t-d)/d \leq 0.1$, and at the same time the protruding portion magnetic layer 32a and the recessed portion magnetic layer 32b are connected with each other by the connecting magnetic layer 32c.

That is, the thickness t of the recessed portion magnetic layer 32b is in the range not smaller than a value smaller than the depth d of the recessed portion 31b by 0.4% of the depth d of the recessed portion 31b and not larger than a value larger than the depth d of the recessed portion 31b by 10% of the depth d of the recessed portion 31b. Further, the protruding portion magnetic layer 32a and the recessed portion magnetic layer 32b are connected with each other by the connecting magnetic layer 32c which is small in cross-section.

It is preferred that the thickness t of the recessed portion magnetic layer 32b is not larger the depth d of the recessed portion 31b, i.e., $-0.004 \leq (t-d)/d \leq 0$. The protruding portion magnetic layer 32a is substantially the same as the recessed portion magnetic layer 32b in thickness, The depth d of the recessed portions 31b (the height of the protruding portions 31a) of the substrate 31 of the master information carrier 3 is preferably in the range of 50 nm to 800 nm and more preferably in the range of 100 nm to 600 nm.

In accordance with the master information carrier 3 of this embodiment, drop of the reproduction output can be suppressed while preventing generation of sub-peaks and ensuring reproducibility.

That is, when information is transferred from a master information carrier of this embodiment to a slave medium, few or no sub-peak is generated in the reproduction waveform, and peak outputs corresponding to opposite ends of the protruding portion magnetic layer 32a on the protruding portions 31a of the master information carrier 3 can be increased, whereby desired information can be correctly transferred. Further, it is preferred that formula $0.01 \leq \delta/t < 0.5$ be satisfied wherein $\delta$ represents the thickness of the magnetic layer of the side wall connecting the magnetic layer 32a on the protruding portions and the magnetic layer 32b on the recessed portions and t represents the thickness of the magnetic layer 32b formed on the recessed portions. More preferably, $\delta$ and t satisfy formula $0.02 \leq \delta/t < 0.3$. When $\delta/t < 0.01$, absorption of the magnetic flux of the magnetic layer is too poor and a sub-peak is generated. When $\delta/t \leq 0.5$, magnetic fluxes in the area free from the pattern are absorbed by the magnetic layer of the side surface of the protruding portion, and the quality of the recorded signal can be deteriorated.

Figure 3:
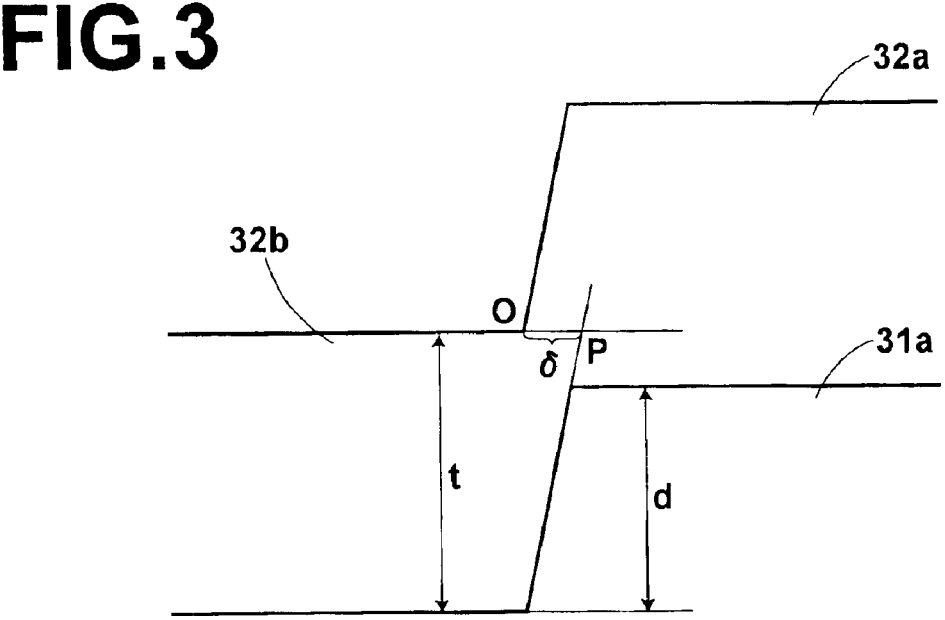
FIG. 3 is a view showing a definition of the thickness $\delta$ of the magnetic layer of the side wall.

When the thickness t of the recessed portion magnetic layer 32b is larger than the depth d of the recessed portion 31b, the thickness $\delta$ of the magnetic layer 32c of the side wall is defined to be distance OP (FIG. 3) between the intersection P, at which the line representing an extension of the inclined side surface of the protruding portion 31a and a line representing the upper surface of the recessed portion magnetic layer 32b intersect, and the intersection O, at which the upper surface of the recessed portion magnetic layer 32b and the side surface of the protruding portion magnetic layer 32a intersect.

Figure 2A:
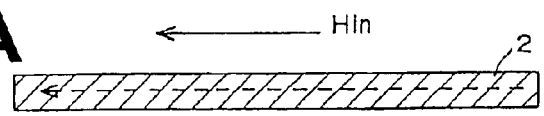
FIGS. 2A to 2C are views illustrating basic steps of the magnetic transfer.
Figure 2B:
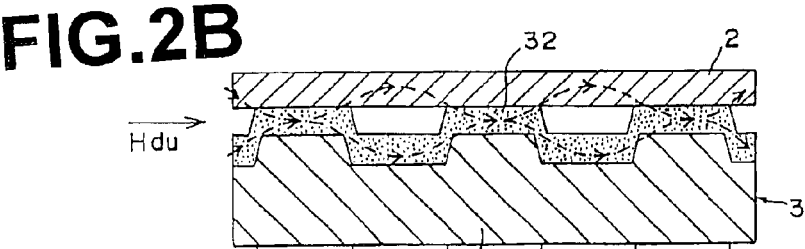
Figure 2C:
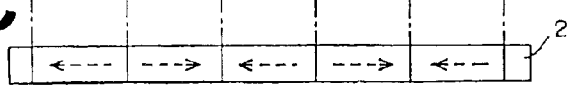

As described above in conjunction with FIGS. 2A to 2C, the master information carrier 3 of this embodiment is brought into close contact with a slave medium 2 which has been initially magnetized in a direction parallel or perpendicular to the recording tracks and a transfer magnetic field is applied by a magnetic field application means such as employing an electromagnet to the master information carrier and the slave medium in close contact with each other in a direction opposite to the direction of the initial magnetization, whereby a magnetization pattern representing the information on the master information carrier 3 is recorded on the slave medium 2.

The substrate 31 of the master information carrier 3 may be formed, for instance, of, nickel, silicon, aluminum, alloys, synthetic resin or the like. The irregularity pattern or the pattern of the protruding portions can be formed, for instance, by the use of stamper method. An example of production of the master information carrier where the irregularity pattern is formed by a stamper method will be described, hereinbelow. A photoresist solution is applied to a plate of silicon wafer glass or quartz having a smooth surface by spin coating or the like, thereby forming a photoresist layer. Thereafter, an electron beam (or a laser beam) modulated according to the information to be transferred such as a servo signal is caused to scan the disc with the photoresist layer, while rotating the plate, to expose the photoresist over in a predetermined pattern, e.g., a pattern corresponding to a servo. Then, the photoresist is developed and is removed from the areas exposed to the beam, whereby an original carrying thereon an irregularity pattern of the photoresist is obtained. Then plating (electroforming) is applied to the original and an substrate having a positive irregularity pattern following the original is obtained. Thereafter, the substrate is peeled off the original.

Otherwise, the original may be plated to form a second original and the second original may be plated to form a substrate having a negative irregularity pattern. Further, a third original may be formed by plating the second original or pressing a resin syrup against the surface of the second original and curing the resin syrup, and a substrate having a positive irregularity pattern may be formed by plating the third original. Whereas, an original may be obtained by etching the plate after the plate is provided with a photoresist pattern to form holes through the plate and removing the photoresist. Thereafter, a substrate can be obtained from the original in the same manner as described above.

The magnetic layer 32 may be formed by, for instance, vacuum film forming techniques such as vacuum deposition or sputtering or ion plating. As the magnetic material, Co, Co alloys (e.g., CoNi, CoNiZr, or CoNbTaZr), Fe, Fe alloys (e.g., FeCo, FeCoNi, FeNiMo, FeAlSi, FeAl, or FeTaN), Ni or Ni alloys (e.g., NiFe) can be employed, FeCo and FeCoNi are especially preferred.

The magnetic layer to be formed on the patterned substrate is made of material whose saturation magnetization is preferably not smaller than 3.5 T (3000 Gauss) and more preferably not smaller than 7.0 T (6000 Gauss).
Experiment In order to prove the effect of the invention, appearance of a sub-peak and output of the slave media were evaluated after the magnetic transfer using master information carriers in accordance with the present invention (embodiments 1 to 4) and not in accordance with the present invention (comparative examples 1 and 2). The result was reported in the following table.

(1) The appearance of a sub-peak was evaluated in the following manner. Each of the slave media was set to an electromagnetic conversion property meter (SS-60 from Kyodo Electronics) and the electromagnetic conversion property meter (having a GMR head which was 0.12 $\mu$m in reproduction head gap, 0.45 $\mu$m in reproduction track width, 0.18 $\mu$m in recording head gap and 0.51 $\mu$m in recording track width) was set to scan the slave medium at a linear speed of 10 m/sec. at a distance 40 mm from the center thereof. Thereafter, the read signal was divided into frequencies by a spectral analyzer and the difference (C1−C2) of the peak intensity C1 of the primary signal and the peak intensity C2 of the secondary signal was measured. The appearance of a sub-peak was evaluated to be ○ when the relative value of the difference C1−C2 based on the value of the head recording signal C1$h$−C2$h$ was not lower than −3.0 dB, to be Δ when the relative value was −0.30 to −4.0 dB and to be × when the relative value was not higher than −4.0 dB.

(2) The output of the slave media was evaluated in the following manner. Under the same conditions as in the evaluation of the appearance of a sub-peak, the average output power over one rotation of the disc (TAA) was evaluated. SNR=20 Log(TAA1/TAA2) was calculated on the basis of the value of the TAA of the slave medium (TAA1) and the value of TAA of the head recording signal (TAA2). The output of the slave medium was evaluated to be ○ when the value of SNR was not lower than −2 dB, to be Δ when the value of SNR was −5 to −2 dB and to be × when the value of SNR was not higher than −5 dB.

Embodiment 1

In the embodiment 1 (emb. 1), the master information carrier of was prepared in the following manner. A patterned Ni substrate having radial lines, 0.15 $\mu$m, 1.0 $\mu$m, 1.1 $\mu$m and 0.1 $\mu$m in bit length, track width, track pitch and depth of groove, in the area between 20 mm to 40 mm in distance from the center was made. Then a soft magnetic layer including 25 at % of FeCo was formed on the patterned Ni substrate in an thickness of 0.1 $\mu$m at a substrate temperature of 25° C. The sputtering conditions were 0.15 Pa (1.08 mTorr) and 2.80 W/cm$^2$ in introduced power, Ar pressure and thickness of the magnetic layer. δ/t was 0.3.

Each of the magnetic recording media (slave media) was a 3.5" magnetic recording disc and was produced by the use of a vacuum metallizer (S-50S sputtering device from Shibaura Mechatronics). That is, the vacuum metallizer was first evacuated to 1.33×10$^{-5}$ Pa (1.0×10$^{-7}$ Torr) at the room temperature and then Ar was introduced into the vacuum metallizer to 0.4 Pa (3.0 mTorr). Under the conditions, a glass plate was heated to 200° C. and a magnetic layer comprising 30 nm thick CrTi film and 30 nm thick CoCrPt film was formed on the glass plate. The magnetic layer was 5.7 T (4500 Gauss) in saturation magnetization Ms and 199 kA/m (25000 e) in coercive force Hc.

Embodiment 2

The embodiment 2 (emb. 2) was carried out in the same manner as the embodiment 1 except that the magnetic layer of the master information carrier was 110 nm.

Embodiment 3

The embodiment 3 (emb. 3) was carried out in the same manner as the embodiment 1 except that δ/t was 0.005.

Embodiment 4

The embodiment 4 (emb. 4) was carried out in the same manner as the embodiment 1 except that δ/t was 0.6.

Comparative Example 1

The comparative example 1 (c/e. 1) was carried out in the same manner as the embodiment 1 except that the magnetic layer of the master information carrier was 97 nm.

Comparative Example 2

The comparative example 2 (c/e. 2) was carried out in the same manner as the embodiment 1 except that the magnetic layer of the master information carrier was 120 nm.

TABLE

|  | (t − d)/d | δ/t | sub-peak (dB) | evaluation | SNR (dB) | evaluation |
|---|---|---|---|---|---|---|
| emb. 1 | 0 | 0.3 | +0.5 | ○ | −0.5 | ○ |
| emb. 2 | 0.1 | 0.3 | +0.0 | ○ | +0.1 | ○ |
| emb. 3 | 0 | 0.005 | −2.1 | Δ | −0.6 | ○ |
| emb. 4 | 0 | 0.6 | −0.9 | ○ | −2.5 | Δ |
| c/e. 1 | −0.03 | 0.3 | −4.6 | X | −1.9 | ○ |
| c/e. 2 | 0.2 | 0.3 | −2.5 | ○ | −6.2 | X |

What is claimed is:

1. A master information carrier for magnetic transfer comprising a substrate having an irregularity pattern representing information to be transferred to a slave medium and a magnetic layer formed on the irregularity pattern on the substrate, wherein the improvement comprises that formula $-0.0004 \leq (t-d)/d \leq 0.1$ is satisfied where d represents the depth of the recessed portions of the irregularity pattern and t represents the thickness of the magnetic layer formed on the recess portions, the magnetic layer formed on the protruding portions of the irregularity pattern and the magnetic layer formed on the recessed portions of the irregularity pattern are connected with each other; and wherein the formula $0.01 \delta/t \leq 0.5$ is satisfied and wherein further, δ represents the thickness of the magnetic layer of the side wall connecting the magnetic layer on the protruding portions and the magnetic layer on the recessed portions.

2. A master information carrier as defined in claim 1 in which $-0.004 \leq (t-d)/d \leq 0$.

3. A master information carrier as defined in claim 1 in which the depth d of the recessed portions of the substrate of the master information carrier is in the range of 50 nm to 800 nm.

4. A master information carrier as defined in claim 3 in which the depth d of the recessed portions of the substrate of the master information carrier is in the range of 100 nm to 600 nm.

5. A master information carrier as defined in claim 1 in which the substrate is formed of material selected from the group consisting of nickel, silicon, aluminum, alloys, and synthetic resin.

6. A master information carrier as defined in claim 1 in which the magnetic layer is formed of material selected from the group consisting of Co, Co alloys, Fe, Fe alloys, Ni and Ni alloys.

7. A master information carrier as defined in claim 6 in which the magnetic layer is formed of FeCo or FeCoNi.

8. A master information carrier as defined in claim 1 in which δ and t satisfy formula $0.02 \leq /t \leq 0.3$.

9. A master information carrier comprising:

a substrate with an irregularity pattern disposed thereon wherein the irregularity pattern comprises alternating recessed and protrusion portions; and a magnetic layer disposed on top of the irregularity pattern, wherein the depth of the recessed portions of the irregularity pattern is represented by d and a thickness of the magnetic layer formed on the recessed portions is represented by t and $-0.004 \leq (t-d)/d \leq 0.1$; and wherein said magnetic layer comprises a connecting portion connecting the magnetic layer formed on the protruding portions of the irregularity pattern and the magnetic layer formed on the recessed portions of the irregularity pattern and wherein further, $0.01 \leq \delta/t \leq 0.5$, wherein δ represents the thickness of the connecting portion.

10. A master information carrier as recited in claim 9, wherein $0.028 \leq \delta/t \leq 0.3$.

11. A master information carrier as recited in claim 9, wherein if t is larger than d, then the thickness δ is defined as a distance between points O and P, wherein further, point P is defined by the intersection of a line representing an extension of a side surface of the protrusion portion and a line representing an extension of an upper surface of the magnetic layer within the recessed portion, and point O is defined by the intersection of the line representing the extension of the upper surface of the magnetic layer within the recessed portion and a side surface of the magnetic layer on the protrusion portion.

* * * * *